(12) United States Patent
Simons et al.

(10) Patent No.: US 12,525,801 B2
(45) Date of Patent: Jan. 13, 2026

(54) SYSTEMS AND METHODS FOR RELAY LOGIC FOR ISOLATION OF THE GRID AND FORMING OF A SINGLE-PHASE ISLAND

(71) Applicant: PPL Services Corporation, Allentown, PA (US)

(72) Inventors: Nate Simons, Allentown, PA (US); Robert Beckett, Allentown, PA (US); Donald Vinciguerra, Allentown, PA (US); Carol Gillette, Allentown, PA (US)

(73) Assignee: PPL Services Corporation, Allentown, PA (US)

( * ) Notice: Subject to any disclaimer, the term of this patent is extended or adjusted under 35 U.S.C. 154(b) by 0 days.

(21) Appl. No.: 18/545,554

(22) Filed: Dec. 19, 2023

(65) Prior Publication Data

US 2025/0202234 A1 Jun. 19, 2025

(51) Int. Cl.
*H02J 3/00* (2006.01)
*H02J 3/32* (2006.01)
*H02J 13/00* (2006.01)

(52) U.S. Cl.
CPC ............ *H02J 3/0073* (2020.01); *H02J 3/001* (2020.01); *H02J 3/32* (2013.01); *H02J 13/00004* (2020.01); *H02J 13/00028* (2020.01)

(58) Field of Classification Search
CPC .. H02J 3/0073; H02J 3/001; H02J 3/32; H02J 13/00004; H02J 13/00028; Y04S 10/14
See application file for complete search history.

(56) References Cited

U.S. PATENT DOCUMENTS

2019/0319481 A1* 10/2019 Jin .................. G01R 31/08
2023/0013208 A1* 1/2023 Hastings .................. H02J 9/068

* cited by examiner

*Primary Examiner* — Rexford N Barnie
*Assistant Examiner* — Thai H Tran
(74) *Attorney, Agent, or Firm* — Haynes & Boone, LLP

(57) ABSTRACT

A system for improving grid reliability in remote or isolated locations includes a battery tripping module, the battery tripping module determining whether a microgrid zone may be formed upon a fault. The system further includes a microgrid formation module, the microgrid formation module forming a microgrid zone, the microgrid zone connected to a BESS (battery electric storage system), the BESS providing power to the microgrid.

2 Claims, 3 Drawing Sheets

SYSTEMS AND METHODS FOR RELAY LOGIC FOR ISOLATION OF THE GRID AND FORMING OF A SINGLE-PHASE ISLAND

BACKGROUND

Some electric utility customers suffer from poor reliability due to their location on the distribution system at the end of long distribution feeders. The single-phase tap these customers are normally supplied from is not subject to many outages (unintended interruption of service), such as tree or animal contacts, but many outages occur upstream from these customers, and due to lack of transfer capability, these customers cannot be restored via normal system reconfiguration, and as a result are exposed to many long-duration outages averaging six-hours (6).

These poor-reliability taps are at the edge of the utility service territory so there are no nearby distribution lines available for transfers, no nearby neighboring utilities available for transfers, and no nearby transmission lines to build a new supply substation. As a result, there are no cost-effective solutions to improve the reliability of these customers using traditional poles-and-wires methods. This leads to non-wires alternatives (NWA), of which a BESS is a cost-effective and innovative.

BRIEF SUMMARY

In many embodiments, the implemented logic for isolation of the grid and forming a single-phase island provides a method for a primary, single-phase recloser control relay to detect a loss-of-grid and, after a time delay, command a Battery Electric Storage System (BESS) to form a microgrid, creating a single-phase island to restore service to customers. Upon restoration of source the logic provides a method to synchronize the BESS to the grid, or if that cannot be achieved, automatically trip the BESS, and close the recloser to restore the customers to normal grid connection.

Embodiments relate to a protective relay programming method to automatically isolate a primary, single-phase tap when a loss-of-source occurs, then automatically command a BESS to form a microgrid. Upon restoration of source the relay logic also automatically commands the BESS to synchronize to the grid, and if that fails, automatically trip the BESS offline and close the recloser to restore customers to their normal grid supply.

Embodiments of the methods presented in this disclosure are for protective relay control scheme to operate a single-phase recloser and command a BESS to form a microgrid to restore these customers when an upstream outage occurs. After grid restoration the protective relay control scheme commands the BESS to synchronize to the grid to create seamless restoration, or if synchronization fails, trip the BESS, then close the isolation recloser to restore the customers to their normal grid supply.

This relay logic is the conveyance for the BESS to automatically restore the customers, providing a reliable method to improve the reliability of these customers by maintaining as much continuity of service as possible.

Embodiments of the method is broken down into four (4) processes to explain its operation. Process 1 is how the protective relay trips the BESS. Process 2 is how the protective relay detects a loss-of-grid and commands the microgrid to form. Process 3 is how the protective relay detects restoration of the grid and commands synchronization. Process 4 is how the protective relay restores the grid naturally if synchronization fails. At all steps in this method constant safety checks are performed to ensure a local or remote operator can block or interrupt operation of the BESS commands to prevent unforeseen arc flash or electrocution risks.

In one embodiment, a system for improving grid reliability in remote or isolated locations includes a battery tripping module, the battery tripping module determining whether a microgrid zone may be formed upon a fault. The system further includes a microgrid formation module, the microgrid formation module forming a microgrid zone, the microgrid zone connected to a BESS (battery electric storage system), the BESS providing power to the microgrid. Alternatively, the battery tripping module is configured to determine whether the fault is in the microgrid zone. In one alternative, the microgrid formation module waits a first preset period before forming the microgrid zone to allow automatic restoration of power. In another alternative, the microgrid formation module closes off the microgrid zone, by activating a recloser. Alternatively, the system further includes a synchronization module, wherein the synchronization module attempts reconnection via synchronization of the BESS with the grid and closing the recloser. In another alternative, the synchronization module trips the BESS offline and closes the recloser. Alternatively, the synchronization module waits a second preset period before attempting to reconnect when grid restoration is detected to ensure the grid restoration is not a transient event. In another alternative, the synchronization of the BESS is limited to a third preset period. Alternatively, comprising a forced reconnection module, the forced reconnection module activating if the BESS does not synchronize in the third preset period. In another alternative, the forced reconnection module trips the BESS offline to isolate the BESS and reconnects power.

In one embodiment, a method of improving grid reliability in remote or isolated locations includes determining whether a microgrid zone may be formed upon a fault. The method further includes forming a microgrid zone, the microgrid zone connected to a BESS (battery electric storage system), the BESS providing power to the microgrid. In one alternative, the method further includes determining whether the fault is in the microgrid zone. In another alternative, the forming of the microgrid zone is delayed a first preset period to allow automatic restoration of power. Alternatively, the method further includes activating a recloser to close off the microgrid zone. In another alternative, the method further includes attempting reconnection via synchronization of the BESS with the grid and closing the recloser. Alternatively, the method further includes tripping the BESS offline and closing the recloser. In another alternative, the method further includes waiting a second preset period before attempting to reconnect when grid restoration is detected to ensure the grid restoration is not a transient event. Alternatively, the method further includes limiting the synchronization of the BESS is limited to a third preset period. In another alternative, the method further includes tripping the BESS offline to isolate the BESS and reconnects power if the BESS does not synchronize in the third preset period.

BRIEF DESCRIPTION OF THE FIGURES

The accompanying drawings, which are included to provide a further understanding of the disclosure, are incorporated in, and constitute a part of this specification, illustrate embodiments of the disclosure and together with the detailed description explain the principles of the disclosure. No attempt is made to show structural details of the disclosure

DETAILED DESCRIPTION

Certain terminology is used herein for convenience only and is not to be taken as a limitation on the embodiments of the Systems and Methods For Relay Logic For Isolation Of The Grid And Forming Of A Single-Phase Island. (embodiments of which may be hereinafter referred to As "Single-Phase Island Relay Logic"). The disclosure describes a logical method for programming protective relays to achieve the described results. A goal of the embodiments of the method, is to securely detect and automatically isolate the grid when an interruption of service occurs, then to restore customers via a BESS, then automatically restore customers to their normal grid supply when the utility source is restored.

A "protective relay" is a type of relay specifically designed to detect power system faults and is commonly used by utilities to protect equipment. Protective relays are also used to control circuit breakers and reclosers and to provide alarm, status, and analog points to other utility systems, but in this disclosure specifically to the distribution management system (DMS) that is utilized by the distribution system operators to monitor and control distribution facilities, and to the energy management system (EMS) that acts as the control system for the BESS hardware.

Protective relays come equipped with only the most basic protection and control functions and as a result must be programmed to provide the desired outcome. Embodiments of the systems and methods include "relay logic", which is the programmable methods implemented inside the protective relays to achieve the desired functions. More detailed descriptions in this disclosure will reference FIG. 1 and FIGS. 2A and 2B and the specific relay logic elements found therein, but it must be noted that the specific logical elements used are sometimes not relevant to the operation of this method, rather it is correct combination of inputs and outputs to the logic described herein that produces the desired result. To clarify by way of an example, it does not matter that SV34T 150 may be replaced with SV38T, so long as the inputs and outputs of SV34T 150 remain the same.

In the context of this disclosure "isolation recloser" refers to a single-phase recloser with a protective relay control that has the specific programming described herein and has the sole purpose of detecting faults, loss-of-grid, and restoration-of-grid, to provide or not provide commands to the BESS as system conditions dictate. This method is for isolation reclosers operating as intelligent fault detectors.

Figure 1:
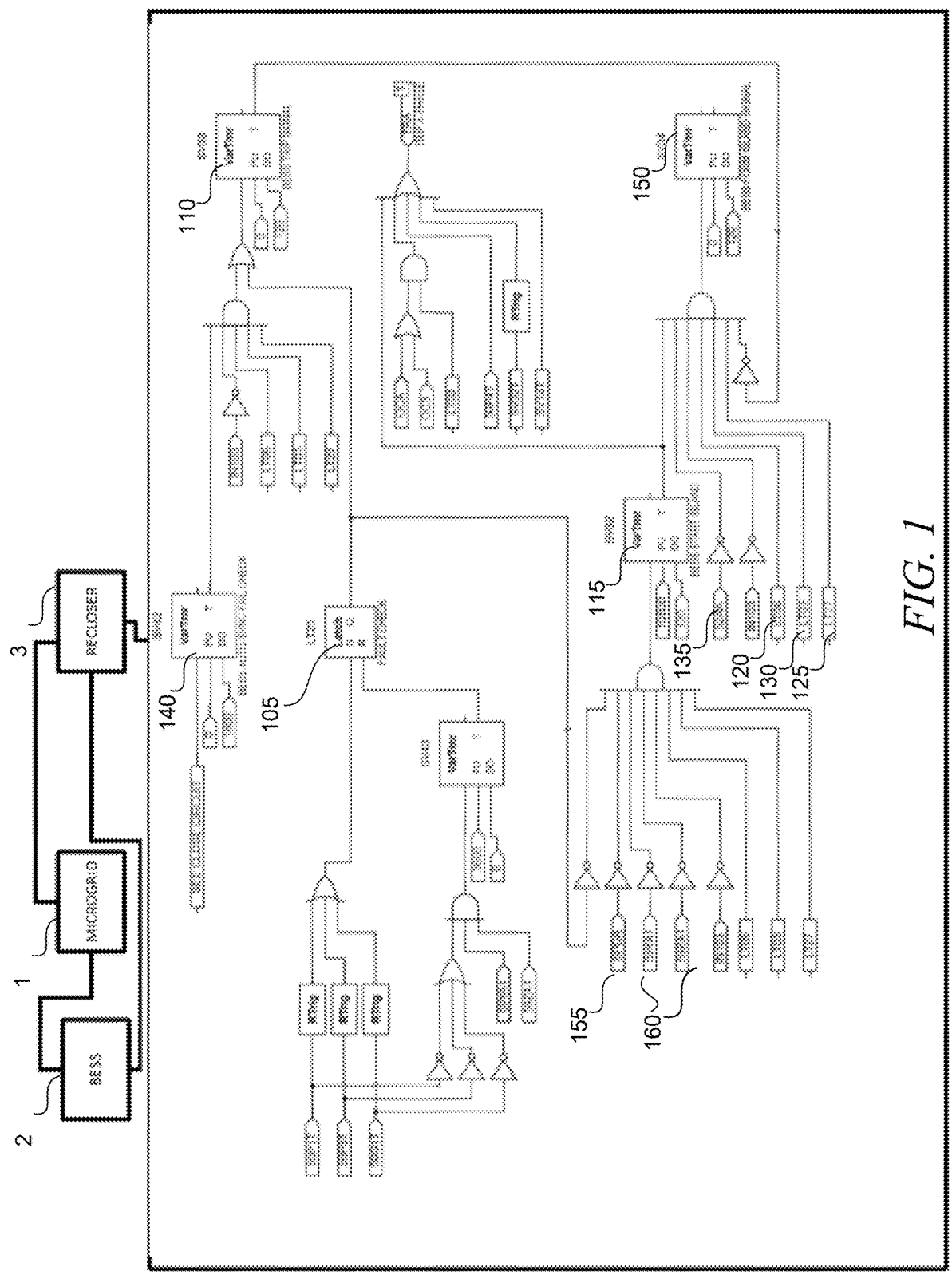
FIG. 1 shows one embodiment of a visual representation of the 'isolation' and 'form island' processes.

In one embodiment, a method for Single-Phase Island Relay Logic is provided. A system for this process is shown in FIG. 1. A first process may be conducted as part of a method for Single-Phase Island Relay Logic. This process may be embodied in a battery tripping module or other module. This process is how the relay commands the BESS to trip offline for a fault in the microgrid zone 1 and ensures the BESS 2 source of energy to the fault is cleared. The grid source of energy to the fault is cleared by upstream protective device(s).

LT25 acts as the fault detector. If any of the overcurrent detection elements assert (50Pn—Relay phase pickup) LT25 105 becomes set and commands the BESS to trip via SV33T 110, which is mapped to a logical output that communicates directly to the BESS EMS controller. If the fault was in the microgrid zone—downstream from the isolation recloser 3—the method stops here because a microgrid cannot be formed.

If LT25 105 does not assert the fault must be upstream from the isolation recloser and the BESS will have tripped on internal anti-islanding protection to isolate its source of energy to the fault.

When this logical check is completed the isolation recloser knows if the fault was in the microgrid zone, in which case the method stops, or outside the microgrid zone, in which case the method proceeds to process 2 to form the microgrid.

Additionally, embodiments of a method of Single-Phase Island Relay Logic may include a second process. This process may be embodied in a microgrid formation module or other module. Once process 1 is complete, and LT25 105 is not set, a three-minute (3) timer starts that, when timed out, will initiate forming of the microgrid. The 3-minute time was chosen to allow automatic restoration systems (FISR) to attempt system restoration via field ties, which happens in 1-2 minutes. The extra minute acts as a buffer in case of slow FISR or switching operation. After 3 minutes have elapsed it is clear the system will not be restored automatically, so the isolation recloser commands the BESS to form a microgrid to restore customers locally. In alternatives, different time periods may be utilized depending on the automatic restoration devices.

Restoration is performed via timer SV32T 115, which has several logical checks to ensure the "form microgrid" command is performed correctly and safely at SV34T 150. This includes ensuring the recloser is already closed (NOT SPOA 155), voltage is lost on the source and load sides of the recloser (NOT 59Yn 160), hot-line tag is not active (LT06 120 and NOT IN103), and the BESS logic is not blocked remotely or locally (LT27 125 or LT03 130). When the SV32T 115 timer ends, a command is sent to the isolation recloser to open via TRA. Simultaneously, a command is sent to SV34T 115, which will send the final "form microgrid" command when the isolation recloser is confirmed open via 52AA 135.

At the close of process 2 the relay will have correctly identified the outage was not caused by a fault in the microgrid zone, tripped the isolation recloser, and commanded the microgrid to form. This will restore the customers in the microgrid zone four-minutes (4) from the start of the interruption of service. The microgrid will then continually supply the affected customers until the BESS loses charge or the grid is restored, leading to process 3.

Figure 2A:
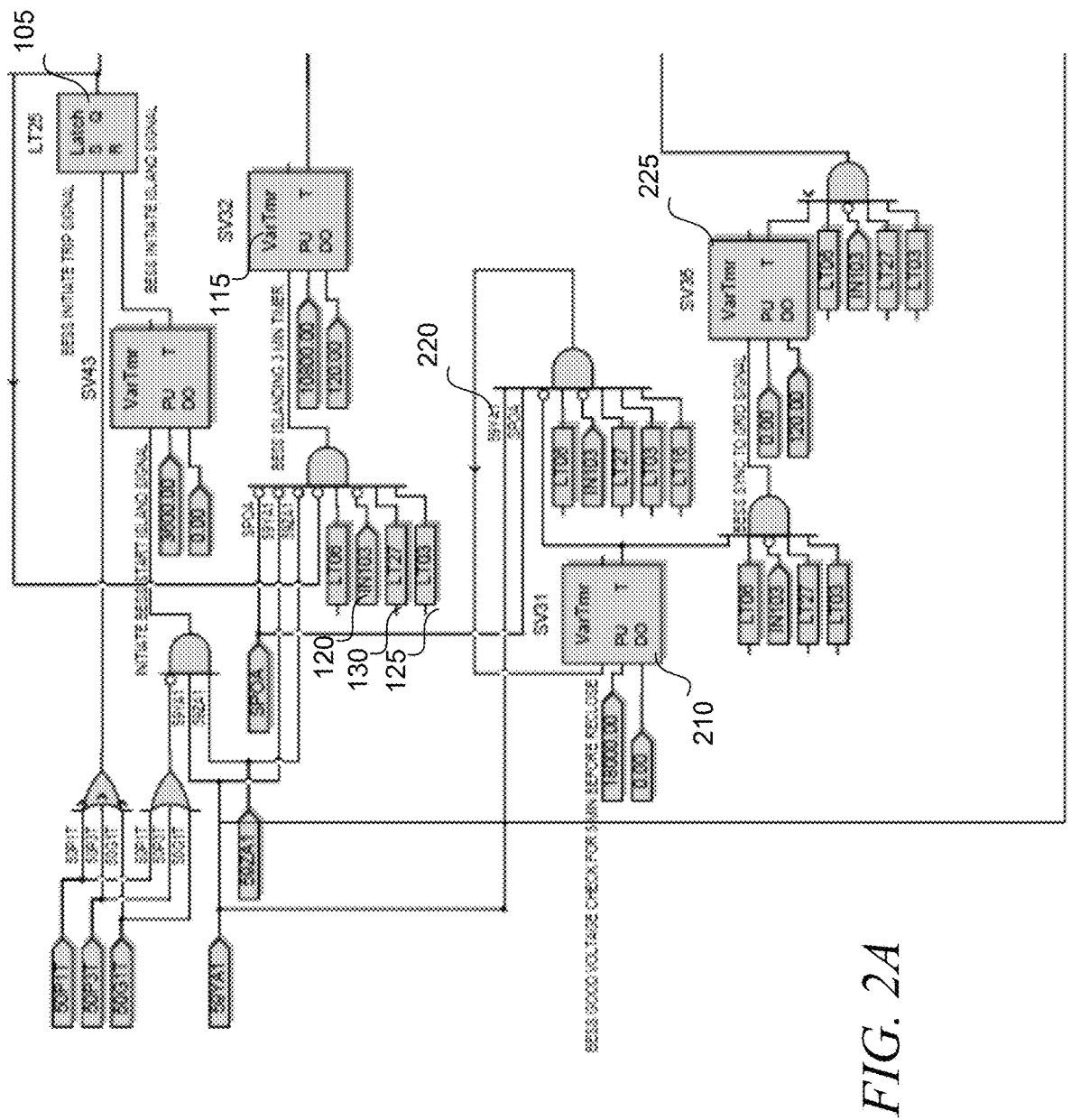
FIGS. 2A and 2B show one embodiment of a visual representation of the 'sync to grid' and 'auto-close' processes, where the diagram has been cut along the right side of FIG. 2A, the leads connecting to the left side of FIG. 2B.
Figure 2B:
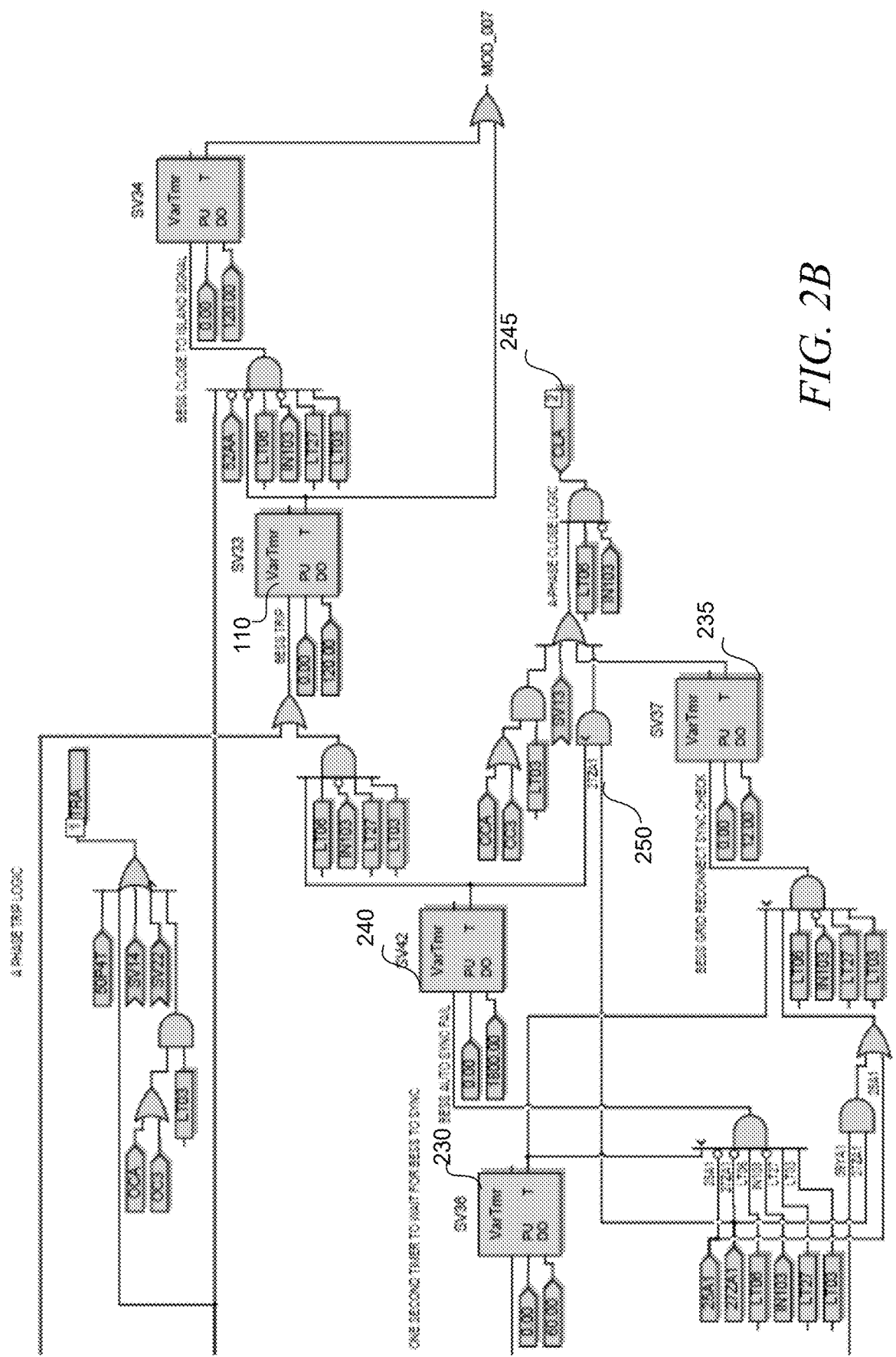

Additionally, embodiments of a method of Single-Phase Island Relay Logic may include a third process (see FIGS. 2A and 2B). This process may be embodied in a synchronization module or other module. Upon restoration of utility source the relay will attempt to reconnect customers to the grid via two options. The first option commands the BESS to synchronize to the grid, then close the recloser to restore the customers to the normal utility supply. The second option will trip the BESS offline and close the isolation recloser to reenergize customers normally if the synchronization checks from option 1 fails.

Timer SV31T 210 starts the restoration process when the grid supply has returned by way of voltage detection element 59YA1 220 asserting for five (5) continuous minutes.

The 5-minute time was chosen to ensure grid restoration is stable and not a transient event caused by switching. Once the 5-minute timer expires SV35T 225 asserts to command the BESS to synchronize to the grid. This starts a branching process via SV36T 230 to SV37T 235, or if that fails, SV42T 240, which is discussed in process 4, that restores the customers to their normal grid supply.

SV35T 225 gives the BESS one-second (1) to synchronize to the grid via SV36T 230. If synchronization is successful SV37T 235 will assert and command the isolation recloser to close via CLA 245. This check also includes a "live-bus, dead-line" check for the scenario where the BESS has depleted its charge before the grid supply returns, allowing for automatic restoration when the grid is restored even if the BESS is no longer supplying the customers.

At the end of this process the BESS will have either synchronized to the grid, in which case the method ends because the customers are restored, or failed synchronization, in which case the method continues to the final process 4.

Additionally, embodiments of a method of Single-Phase Island Relay Logic may include a fourth process. (See FIGS. 2A and 2B) This process may be embodied in a forced reconnect module or other module. After the 1-second assertion of SV36T 230, if the BESS does not synchronize, SV42T 240 will assert and SV37T 235 will not assert. This will immediately send a trip command to the BESS via SV33T to isolate it from the grid, temporarily placing the microgrid customers out of power. Thirty-seconds (30) later, SV42T 240 will command the isolation recloser to close via CLA, fully restoring the customers to normal grid supply.

The 30 second time was chosen to allow a buffer for the BESS to trip itself offline after the trip command is sent. There is also an additional voltage safety-check via 27ZA1 250 when SV42T 240 commands a close to ensure the BESS is in fact offline before the isolation recloser closes.

At the end of this process all customers have been restored to normal grid operation and the BESS is manually or remotely reconnected to the grid to replete its charge in preparation for the next outage.

Logic Brief

The specific succession of logical steps discussed herein was chosen by analyzing real-world outage experience, which showed that it is best to allow automatic restoration system (FISR) to attempt restoration of the customers first using traditional switching methods. If FISR does not restore the customers via field ties the logic described herein will operate the isolation recloser and command the BESS to form the microgrid, restoring customers on the affected tap.

In total, these customers typically experience outages of up to six-hours (6) without the BESS. With the BESS and the logic discussed herein these customers can be automatically restored in four-minutes (4), reducing interruption time by 98%.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

In various instances, parts of the method may be implemented in modules, subroutines, or other computing structures. In many embodiments, the method and software embodying the method may be recorded on a fixed tangible medium.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof. In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

We claim:

1. A system for improving grid reliability in remote or isolated locations, the system comprising:
    a battery tripping module, the battery tripping module determining whether a microgrid zone may be formed upon a fault;
    a microgrid formation module, the microgrid formation module forming a microgrid zone, the microgrid zone connected to a BESS (battery electric storage system), the BESS providing power to the microgrid, wherein the battery tripping module is configured to determine whether the fault is in the microgrid zone, the microgrid formation module waits a first preset period before forming the microgrid zone to allow automatic restoration of power, the microgrid formation module closes off the microgrid zone, by activating a recloser;
    a synchronization module, wherein the synchronization module attempts reconnection via synchronization of the BESS with the grid and closing the recloser, wherein the synchronization module trips the BESS offline and closes the recloser, the synchronization module waits a second preset period before attempting to reconnect when grid restoration is detected to ensure the grid restoration is not a transient event, the synchronization of the BESS is limited to a third preset period;

a forced reconnection module, the forced reconnection module activating if the BESS does not synchronize in the third preset period, wherein the forced reconnection module trips the BESS offline to isolate the BESS and reconnects power.

2. A method of improving grid reliability in remote or isolated locations, the method comprising:

determining whether a microgrid zone may be formed upon a fault;

forming a microgrid zone, the microgrid zone connected to a BESS (battery electric storage system), the BESS providing power to the microgrid;

determining whether the fault is in the microgrid zone, wherein the forming of the microgrid zone is delayed a first preset period to allow automatic restoration of power;

activating a recloser to close off the microgrid zone;

attempting reconnection via synchronization of the BESS with the grid and closing the recloser;

tripping the BESS offline and closing the recloser;

waiting a second preset period before attempting to reconnect when grid restoration is detected to ensure the grid restoration is not a transient event;

limiting the synchronization of the BESS is limited to a third preset period;

tripping the BESS offline to isolate the BESS and reconnects power if the BESS does not synchronize in the third preset period.

* * * * *